US008353481B2

(12) United States Patent
Rosen

(10) Patent No.: US 8,353,481 B2
(45) Date of Patent: Jan. 15, 2013

(54) SPIN-STABILIZED LANDER

(76) Inventor: Harold Rosen, Santa Monica, CA (US)

( * ) Notice: Subject to any disclaimer, the term of this patent is extended or adjusted under 35 U.S.C. 154(b) by 945 days.

(21) Appl. No.: 12/359,303

(22) Filed: Jan. 24, 2009

(65) Prior Publication Data

US 2009/0206204 A1 Aug. 20, 2009

Related U.S. Application Data

(60) Provisional application No. 61/023,195, filed on Jan. 24, 2008.

(51) Int. Cl.
*B64G 1/28* (2006.01)
(52) U.S. Cl. ........................... 244/164; 244/23 C
(58) Field of Classification Search .............. 244/23 C, 244/164, 171
See application file for complete search history.

(56) References Cited

U.S. PATENT DOCUMENTS 3,863,869 A * 2/1975 Bachman .................... 244/23 D
6,016,991 A * 1/2000 Lowe, Jr. ........................ 244/5

* cited by examiner

*Primary Examiner* — Tien Dinh
*Assistant Examiner* — Michael Kreiner
(74) *Attorney, Agent, or Firm* — Michael Ries

(57) ABSTRACT

The invention provides a novel, low-cost, spin-stabilized lander architecture capable (with appropriate system scaling tailored to the attributes of the target) of performing a soft-landing on a solar-system body such as Earth's Moon, Mars, Venus, the moons of Mars, Jupiter, Saturn, Uranus and Neptune, selected near-Earth and main-belt asteroids, comets and Kuiper belt objects and even large human-made objects, and also moving about on the surface of the target solar-system body after the initial landing in movement akin to hopping.

5 Claims, 8 Drawing Sheets

SPIN-STABILIZED LANDER

This application claims priority to U.S. provisional application Ser. No. 61/023,195 filed Jan. 24 2008.

TECHNICAL FIELD

The present invention applies generally to the field of systems for soft landing on solar-system bodies, and in particular to apparatus and methods for a vehicle or "lander" capable of performing such a soft-landing and also capable of extensive mobility or roaming capability after the initial landing.

BACKGROUND OF THE INVENTION

Early unmanned landers used to explore the Moon in the 1960s, e.g., the U.S.S.R. Luna series and the U.S. Surveyor series, employed complex three-axis, body-stabilized systems, complex attitude and orbit control systems, complex thermal control systems, complex instrumentation systems, and complex landing systems. Such systems were very expensive. An objective of the present invention is to provide the capabilities of landers such as these at much lower cost, while adding new capabilities or enhanced capabilities at low cost.

The present invention incorporates some design features of the 1960s spin-stabilized Syncom communication satellite (the first successful geosynchronous telecommunication satellite) and subsequent spinning satellite designs that evolved during the following couple of decades, and adds some new capabilities and improves other capabilities. For example, in the present invention the spinning spacecraft body is outfitted with a landing system to convert it to a soft lander; furthermore, capability is added to the lander to enable its travel over the surface of the Moon or other solar-system body by "hopping", giving the lander the new mobility capability which includes being able to avoid obstacles. Also, the lander's integral propulsion system, with axial thrusters used as a retro-rocket, reduce descent-phase propellant consumption and increase the propellant available for hopping, thereby increasing the travel range across the surface to 100s of meters, if not several kilometers Development of this concept and the novel features described herein began in late 2007 by an experienced team of space-systems engineers—the Southern California Selene Group (SCSG), led by Dr. Harold A. Rosen—determined to win the Google Lunar X PRIZE (GLXP), announced in fall 2007. This as yet unclaimed prize is to be awarded to the first team that can successfully land a privately/commercially developed craft on the surface of the Moon while complying with a set of specific teaming, timeline, design and operational guidelines. During the course of several months from late 2007 to mid-2008 the SCSG team matured the spinning lander concept and made preparations for launch of the first proof-of-concept vehicle on a Space Exploration Technologies, Inc. (SpaceX) Falcon 1e rocket. In the first end-to-end point design, the Falcon 1e payload (or launch stack) consisted of a solid rocket motor kick stage for delivering the translunar injection burn, a multi-function interstage for facilitating initial system spinup and Earth-to-Moon cruise maneuvers, another smaller solid rocket motor for the braking maneuver at the Moon, and the spinning lander having hopping capabilities in accordance with the GLXP rules and the present invention. In this initial end-to-end concept both the interstage and the lander were outfitted with separate monopropellant (monoprop) hydrazine propulsion systems. Improved mission performance was demonstrated by the team's efforts on a more elegant end-to-end point design later in 2008 by replacing these monoprop systems and the smaller kick stage with a single, multi-function bipropellant (biprop) propulsion system integrated into the lander. This biprop design became the SCSG team's preferred approach for winning the GLXP.

The GLXP rules required that after landing on the surface of the Moon the landed craft—or another separate craft that landed with the main lander—traverse the surface an additional 500 meters. Most of the dozen or so system designs entered by the various competing GLXP teams involved landing one craft and then traversing with another, smaller rover-like craft. Since the spinning lander described by the present invention at landing has a functional and robust power supply, telecommunications system, propulsion system and instrumentation/sensor suite, not much more is needed for the roaming part of the GLXP mission. Thus, it is both mass- and cost-effective to roam the lander itself instead of providing for a separate roamer that would need to duplicate the functions of these systems. The cost of roaming in this approach is simply the additional liquid propellant needed for the roaming hops. In the GLXP point designs worked out by the SCSG team, approximately half of propellant loaded into the lander would be available for roaming after a nominal landing. Hopping rather than roving or crawling enables traveling across the surface easily, because the presence of obstacles in the path between waypoints can be avoided by a hopping roamer that can leap over them in a single bound.

SUMMARY OF THE INVENTION

The invention provides a novel, low-cost, spin-stabilized lander architecture capable (with appropriate system scaling tailored to the attributes of the target) of performing a soft-landing on a solar-system body such as Earth's Moon, Mars, Venus, the moons of Mars, Jupiter, Saturn, Uranus and Neptune, selected near-Earth and main-belt asteroids, comets and Kuiper belt objects and even large human-made objects, and also moving about on the surface of the target solar-system body after the initial landing in movement akin to hopping.

BRIEF DESCRIPTION OF THE DRAWINGS

The present invention is illustrated by way of example, but not by way of limitation, in the figures of the accompanying drawings in which like reference numerals refer to similar elements and in which.

DETAILED DESCRIPTION OF THE INVENTION

Figure 1:
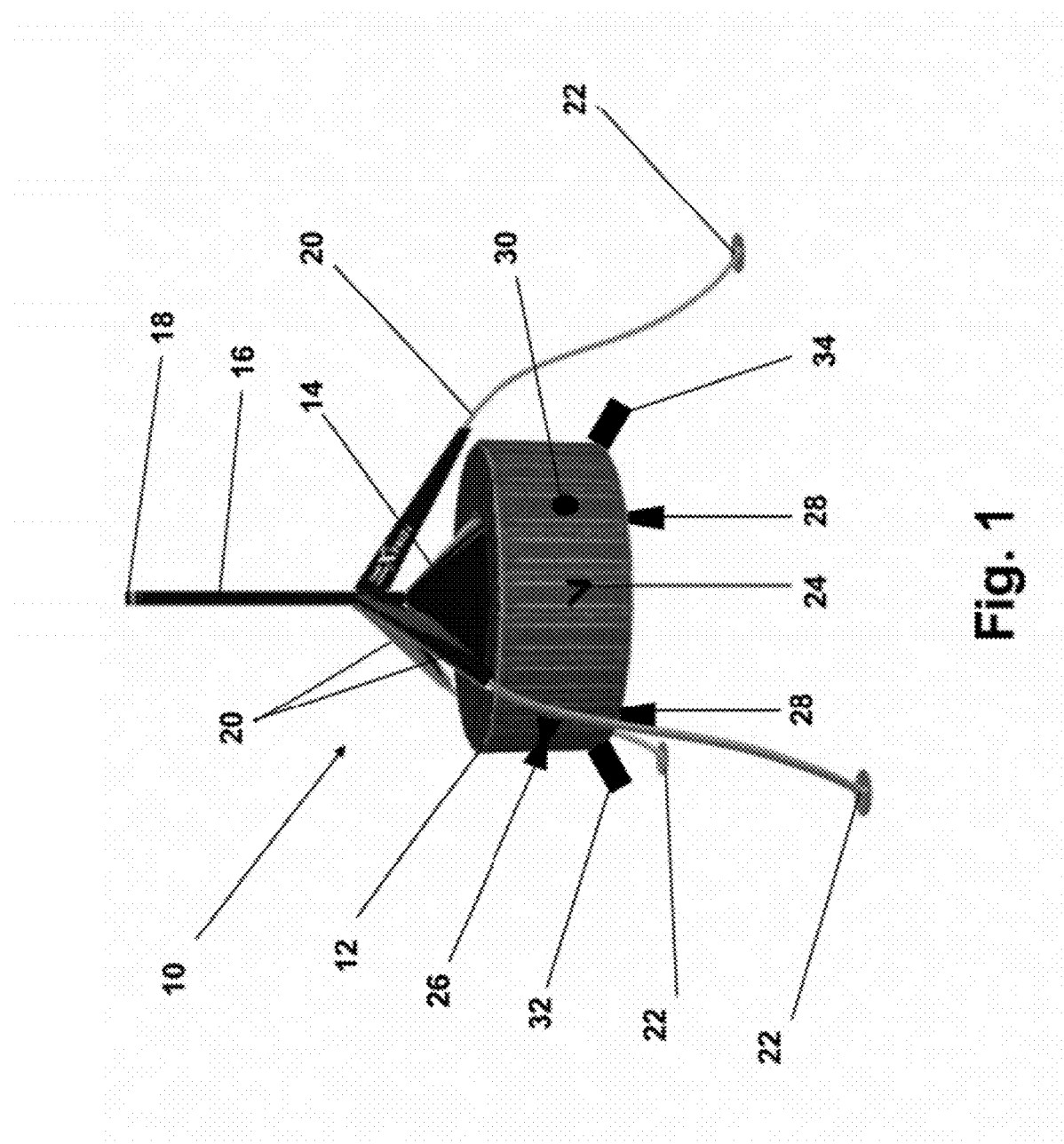
FIG. 1 is an isometric view of a first embodiment of the present invention—the point-design lander developed by the SCSG team for the GLXP competition employing a monoprop system—that highlights key elements of the design, some of which are oversized and darkened in this view in particular the radar antennas to enhance their visibility and location on the vehicle.

The present invention provides a novel, spin-stabilized vehicle for landing on, and moving about, a solar system body. Compared to conventional lander design approaches demonstrated during the past 45 years or so, the mass savings, overall packaging efficiency and multi-functional capabilities brought about by the present invention enable soft landers to be launched by existing and envisioned rockets on the lower end of the performance and cost scale. This landing approach, suitably modified for the particular mission, will permit low cost commercial and scientific missions to the Moon and other targets in the solar system.

The present invention solves this problem by using many design features of the 1960s spin-stabilized Syncom communication satellite, adding the functional elements needed for the transfer orbit to the Moon (or other solar-system body), landing and roaming on the lunar surface (or other body), and implementing the electronic elements in modern, mostly digital components. The use of modern electronic elements not available for earlier missions, when combined with simplifications associated with the spinning configuration, result in a total mission cost for a lunar landing, including launch costs, of a small fraction of the Surveyor costs in today's dollars.

While the discussion below focuses on embodiments of the present invention as applied to lunar landing missions, other embodiments can be defined for many other solar-system targets, just as the fundamental spinning satellite design concepts pioneered in the early 1960s were successfully adapted in subsequent decades to meet demanding objectives for missions throughout the solar system. Similarly, the present invention is relevant to terrestrial applications such as cargo delivery into remote and/or unimproved regions on Earth. Embodiments of the present invention can be envisioned for just about any locale in the solar system having a firm surface to land on. Key novel features of the present invention are summarized immediately below, followed by a more detailed treatment that refers to FIG. 1 through FIG. 8.

Spin-stabilized lander/hopper. The core aspect of the present invention is a unique dual-spin lander architecture for soft landing and navigating on the surface of the target solar-system body. This architecture includes a spinning section providing gyroscopic attitude stability (stiffness) and other useful spinning functions and accommodations for most power, propulsion (for attitude control and for applying controlled forces necessary to soft land and hop) and avionics functions, plus a despun section having one or more legs with landing pads (feet) for contact with the surface, a telecommunications antenna assembly and provisions for useful payloads.

Simple, low-mass landing gear. The complex landing gear of the earlier lunar, Mars and Venus lander designs, which typically required fairly rigid leg structural members and internal viscous dampers on each leg, is replaced by a set of one or more simpler and lighter spring-like landing legs of a construction similar to semi-stiff fishing poles. The spinning lander body stabilizes (via gyroscopic stiffness) the touch-down phase of the landing in a way that allows the compliance of the springy landing legs and skipping/sliding of the feet on the surface to damp the mechanical oscillation of the touch-down, eliminating the need for dampers in the legs. This landing architecture is inherently resistant to tipping or chaotic landing behavior across a wide range of unimproved (or improved) landing surfaces and conditions.

Spinning descent radar. In earlier body-stabilized landers, three range and velocity measuring radars were required to measure the approach velocity and range vectors during the critical terminal descent phase. In the spinning configuration of the present invention, a single radar, whose beam is tilted about 20 to 30 degrees away from the craft's spin axis, suffices to provide the necessary velocity and range vectors. For the intended vertical final descent for the GLXP mission scenario, the modulation of the Doppler frequency at the lander's spin rate measures the surface velocity vector, while the average Doppler frequency measures the velocity component perpendicular to the surface.

Integral, multi-function propulsion system. In the first embodiment of the present invention, the concept employs separate monoprop systems on the lander and interstage to meet required mission objectives. The lander's system supports lander spin-up and spin-down functions, lander spin-axis attitude changes, landing and hopping; the interstage's system supports initial launch stack spinup after separation from the launch vehicle, Earth-to-Moon cruise maneuvers and interstage/lander stack attitude changes. In a second and preferred embodiment of the present invention, the two monoprop systems are replaced by a single biprop system that supports all required mission functions. The monoprop embodiment represents a payload launch mass on the Falcon 1e of about 700 kg and hopping distance capability after landing on the Moon of about 1000 meters. The preferred biprop embodiment represents an approximately 900 kg launch payload and offers the potential of a hopping range of up to 5000 meters. This improved mission result is achieved by the lander propulsion system switch from monoprop to biprop, taking advantage of improvements in launch vehicle payload capacity, and transferring propulsion functions that had been performed by the interstage into the lander. This greatly simplifies the interstage, which allows a greater mass allocation for electronics in the lander. Both embodiments described herein demonstrate the effectiveness of this integral propulsion approach.

Simple, low-mass antenna system. The antenna systems needed for telemetry, command, and control during the transfer orbit and during lunar operations, and for high data rate transmissions of video, can be simplified relative to those required for body-stabilized (3-axis) designs by using the same antenna for all functions and for all phases of the mission. In the embodiments of the present invention presented herein, since the spinning control thrusters permit orbit adjustments in any direction at a constant attitude during the transfer orbit, a constant spin axis attitude is used during the transfer orbit, perpendicular to the ecliptic plane. At this attitude the direction to the Earth is always perpendicular to the spin axis. In the embodiment of the present invention for a lunar landing, by selecting a landing site suitably far from the 0 degree latitude, 0 degree longitude point on the lunar surface, the direction to the Earth during lunar operations can become arbitrarily close to perpendicular to the spin axis. This permits the use of a relatively narrow downlink beamwidth in any plane containing the spin axis, while using a circular beam pattern around the spin axis. This "high gain omni" pattern is easily formed by collinear dipoles on the spin axis, requires no beam steering, and permits the required data rates during all phases of the operation to be achieved with modest transmitter power. For operations at other lunar landing sites which may be required for follow-on missions, a medium-gain Earth-facing antenna can be added for the lunar operations phase.

Design efficiency and robustness, scalability and adaptability. Hundreds of spinning spacecraft have been employed for Earth-orbiting and deep-space missions since the early 1960s, but never as the core basis for a landing vehicle. Experience with these systems over a 45-year period demonstrates that the spinning design—especially when implemented in the dual-spin (spinning and despun sections) architecture—is quite efficient and robust and very amenable to scaling. Thus, if more (or less) power, propulsion, telecommunication performance or payload accommodations are required for a given mission application, the fundamental architecture can be scaled up or down to meet these requirements. Most of these lessons learned may be applied to the spinning lander concept as embodied by the present invention. Also, this fundamental spinning lander concept may be applied to landing applications on Earth, such as delivering cargo and equipment into remote, unimproved areas. (For terrestrial applications, cargo planes, not rockets, would be the likely lander delivery vehicles.)

A combined Sun/lunar attitude sensor. For lunar landing missions, an amplifier is added to the V-beam Sun sensor like that used on Syncom to enable its use as a Moon sensor as well, which permits the simplest possible attitude determination sensor. This concept can be selectively adapted for use at other solar-system target bodies.

Enhanced landing leg feet. For more extensive roaming which may be desired for future commercial and scientific missions, the landing feet may be replaced by more exotic feet, such as electrically powered wheels or tracks, which will allow for a combination of hopping and rolling, and for a for more controlled or more robust surface mobility.

As shown in FIG. 1, the first embodiment of the present invention 10—the GLXP monoprop lander design—looks very similar to the original Syncom satellite, only it has legs. As is common with most spinning spacecraft, the lander comprises core engineering systems such as a solar cell power supply on the outer surface of its spinning section 12, a propulsion system, attitude determination system, telemetry and communication transmitters, a command receiver, transmit and receive antennas, and at least one control processor. The spinning section 12 provides the gyroscopic spin stabilization (stiffness) during all mission phases—especially the landing phase for the present invention. The despun section 14 is attached to the top of the spinning section by a motor/bearing assembly (See FIG. 3) and is free to rotate at a different spin rate than the spinning section. Attached to the despun section and aligned along the centerline (spin axis) of the entire vehicle is the antenna mast 16 and on top of this mast a despun payload module 18, which is also separately controllable in spin around the mast and vehicle centerline (see FIG. 3). Fundamental to the invention is a set of one or more landing legs 20, which are firmly attached to the despun section in a symmetric spacing. The one-legged embodiment suggests a single leg structure akin to an inverted umbrella-like or flexible bowl-like system while a two-legged embodiment suggests a design employing two wide legs akin to those used on catamaran boats or pontoons used on water-landing aircraft. Three- and four-legged designs are more conventional with past planetary and terrestrial lander embodiments.

At the tip of each landing leg is a landing leg pad 22 whose design is tailored for the intended landing surface(s) and mission objective(s). FIG. 1 also shows several key elements of the lander accommodated by the spinning section such as the V-beam attitude sensor 24, tangential (spin-up/spin-down) thrusters 26, axial (vertical) thrusters 28, radial (horizontal) thrusters 30, spinning radar transmit antenna 32 and receive antenna 34. The lander is carried into space as part of the payload carried by a launch vehicle. The payload (launch stack) includes the lander and an interstage module (see FIG. 4). Payload module 18 accommodates multiple payloads, including a payload (not shown) that is configured to use the pointing capability of the despun section to point this auxiliary payload toward a selected azimuth direction.

Figure 2:
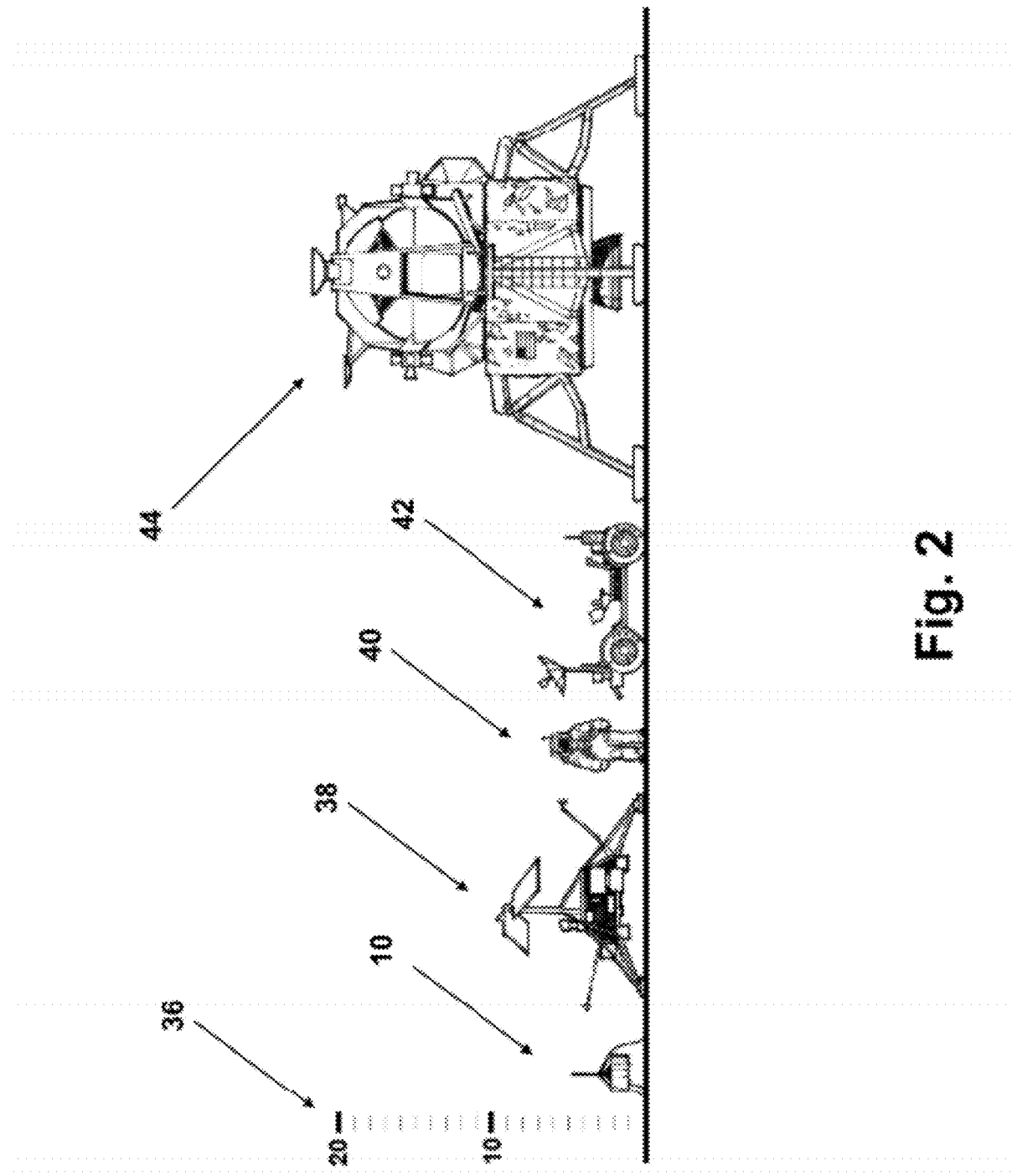
FIG. 2 is a side view of the lander in FIG. 1 shown to scale with other notable lunar artifacts.

In FIG. 2 the the monoprop embodiment of the lander 10 is shown to scale 36 (in feet) with other notable lunar artifacts such as the Surveyor lander 38, an Apollo moonwalking astronaut 40, the Lunar Roving Vehicle 42 and Lunar Excursion Module 44. It is especially poignant to compare the relative size of the spinning lander to Surveyor, demonstrating how efficient the spinning lander architecture can be since the functionality of the two systems on the lunar surface is comparable. Again, a key feature of the present invention is that landing legs have been added to the despun section of the lander.

Figure 3:
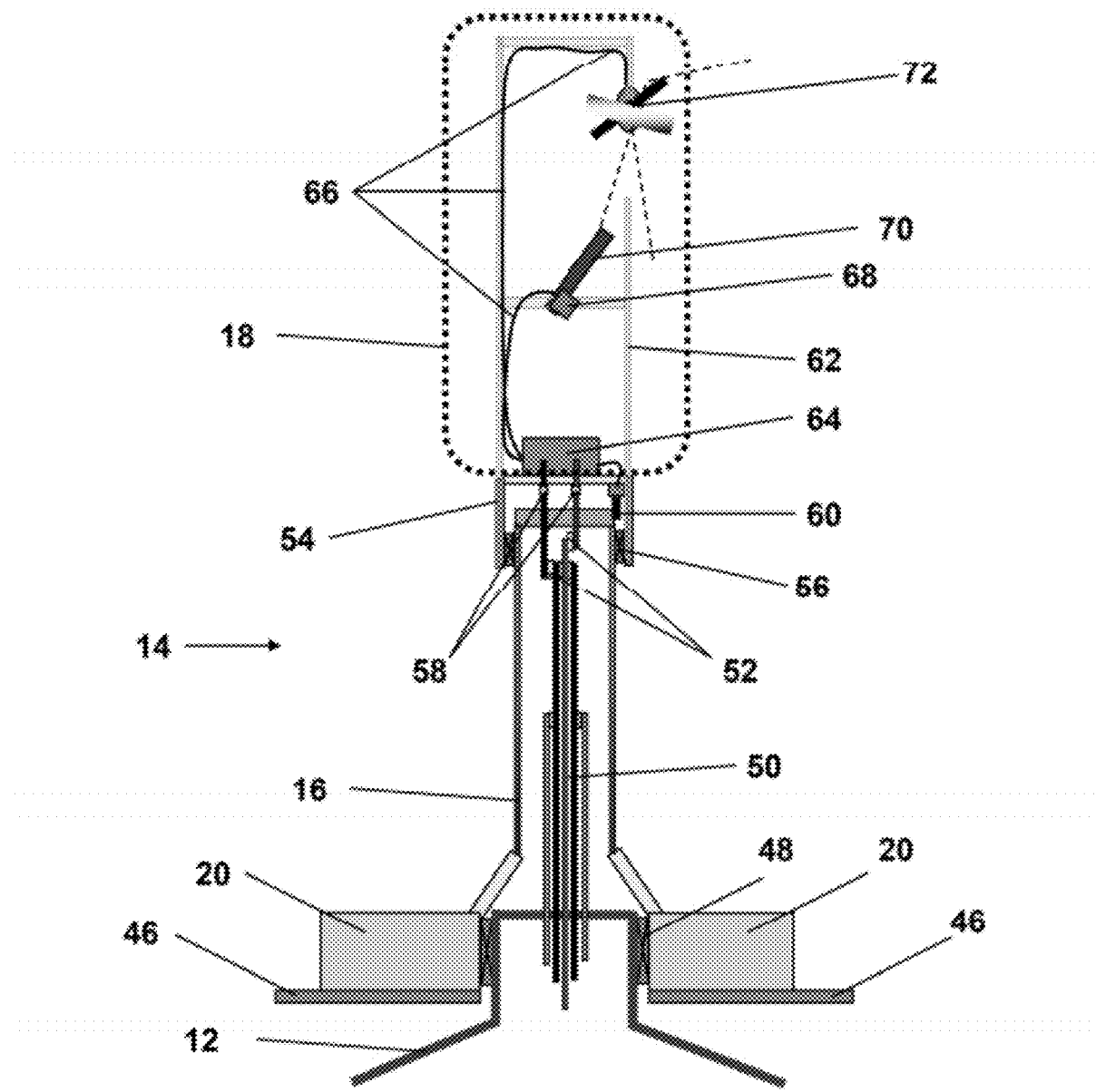
FIG. 3 is a cross-sectional side view of the upper end of the lander illustrating how the spinning and despun sections are mechanically and electrically attached and function together.

In FIG. 3 the top end of the spinning section 12 is shown as a rotor, mechanically connected to the despun section 14 via the despin motor/bearing assembly 48. A triaxial RF antenna 50 essentially of the same design as the Syncom geosynchronous satellite from the early 1960s is shown rigidly attached the spinning section, aligned with its spin axis. (Not all details of this antenna design are drawn.) All communications with the lander—telemetry, command, and wideband data from the Moon—are via this antenna and the communication system on the spinning section of the lander. The despun section structure consists of a despun shelf structure 46 which overlays and protects the spinning rotor below it, the landing legs 20 (1 or more), and microwave transparent antenna mast 16. The separately rotatable despun payload module 18 is shown at the top of the antenna mast affixed to the payload module pan platform 54, with its azimuthal stepper motor/gear-train assembly 60 and bearing assembly 56 near its bottom end. Electrical (power and signal) connectivity between the spinning section and despun section is provided by a set of despin slip-ring brush assemblies 52. The uplink coaxial antenna feed is used for the additional function of bringing the signals to the depin slip rings. Likewise, electrical connectivity between the despun section and the despun payload module is provided by a set of payload module slip-ring brush assemblies 58. This overall architecture for enabling mechanical and electrical connections between sections of dual-spin spacecraft has been successfully demonstrated for over 30 years.

The imaging payload for the GLXP mission embodiment of the present invention is shown in FIG. 3 to illustrate how the despun payload module 18 could be employed for a useful function—in this case imaging of the landing site from the lander. On top of the payload pan platform 54 is mounted the payload module support structure 62, which provides a place to integrate the payload module control electronics 64 and route the payload wiring harness 66 where needed. The payload focal plane assembly/sensor head 68 and payload sensor optics assembly 70 are mounted and aligned such that the boresight of the fixed sensor lines up with the payload sensor tilt mirror/stepper motor assembly 72. The tilt mirror provides the elevation (up-down) control movement for the sensor field of view while the payload pan platform provides the azimuthal (right-left) motion. In addition, controlling the position of the despun platform provides a redundant azimuthal position control functionality for the payload module. All of these motion control functions can be exercised during any landing, takeoff or hopping sequence; they are not limited to use only when the lander is on the surface.

Focusing on the RF antenna in FIG. 3 as adapted to the embodiment of the present invention, the telemetry and wideband data links, which share the same downlink antenna and ten-watt power amplifier, operate in the allocated space-to-Earth portion of S-band. As allowed by international regulatory constraints, other embodiments may use other frequency bands such as UHF, C–, X–, Ka, Ku or optical/laser links, as is common practice in the spacecraft field. The command link uses the uplink antenna and operates in the Earth-to-space portion of S-band. The command receiver and telemetry transmitter will provide a phase coherent two-way Doppler signal for orbit determination during the days-long Earth-to-Moon transfer orbit. The power transmitted by the downlink antenna permits a substantially higher data rate capability than the amount needed for many lunar mission applications (such as GLXP video "Mooncasts"), and provides the ability to transmit a data stream continuously throughout the different phases of a mission. The downlink antenna provides more than sufficient gain (about 5 dB) without requiring any moving parts or electronic beam steering. This is possible because the lander orbit control system provides the velocity corrections at a constant spin axis attitude, so the direction to the Earth stays constant relative to the spin axis throughout the transfer orbit. It also is constant throughout the lunar operations, and differs from the transfer orbit case by only 20 degrees. This permits the use of an antenna with a relatively small beam-width in any plane containing the spin axis, enhancing its gain. This downlink antenna is a coaxial-cable-fed collinear array of sleeved dipoles located inside an RF-transparent mast 12 (FIG. 3). Its beam pattern is a figure of revolution around the spin axis, but it has directivity in any plane containing the spin axis, with a beam-width of 30 degrees. The beam center will be squinted north by 10 degrees, so that the off-beam center gain loss will be the same for the transfer orbit (in which the Earth is broadside to the spin axis) and lunar operations (which for the chosen 70 degrees West longitude site and a locally vertical spin axis attitude is 20 degrees north of broadside). In contrast, the uplink antenna does not require as much gain. It consists of a single coaxial-cable-fed sleeved dipole located just above the transmit antenna. In this simple arrangement, the outer conductor of the uplink antenna's coaxial feed is the inner conductor of the downlink antenna's coaxial feed. An antenna similar to this one was used on the first geostationary satellite, Syncom, and on the first commercial communication satellite, Early Bird. By such use, it is clear that some of these earlier technologies are appropriate for use in low-cost access to space today.

The embodiment of the present invention baselined using the commercial Universal Space Network to meet telemetry and command requirements for the GLXP mission. Three longitudinally separated tracking stations were sufficient to provide a continuous link to the spacecraft during Earth-to-Moon transit and during landing and hopping. To support higher data-rate roadcasts such as GLXP Mooncasts, the Allen Telescope Array (ATA) was found to be a good match for this system. The ATA has 1000 square meters of capture area (from the presently installed 42 co-located antennas) and a low front-end noise temperature, which, when combined with the natural noise of the Moon, gives a system noise temperature of 180K (46K from the ATA front end and 134K from the Moon). In conjunction with the reference downlink antenna gain and transmitter power, this permits a Moon-to-Earth transmission data rate of at least 2 Megabits per second.

Figure 4:
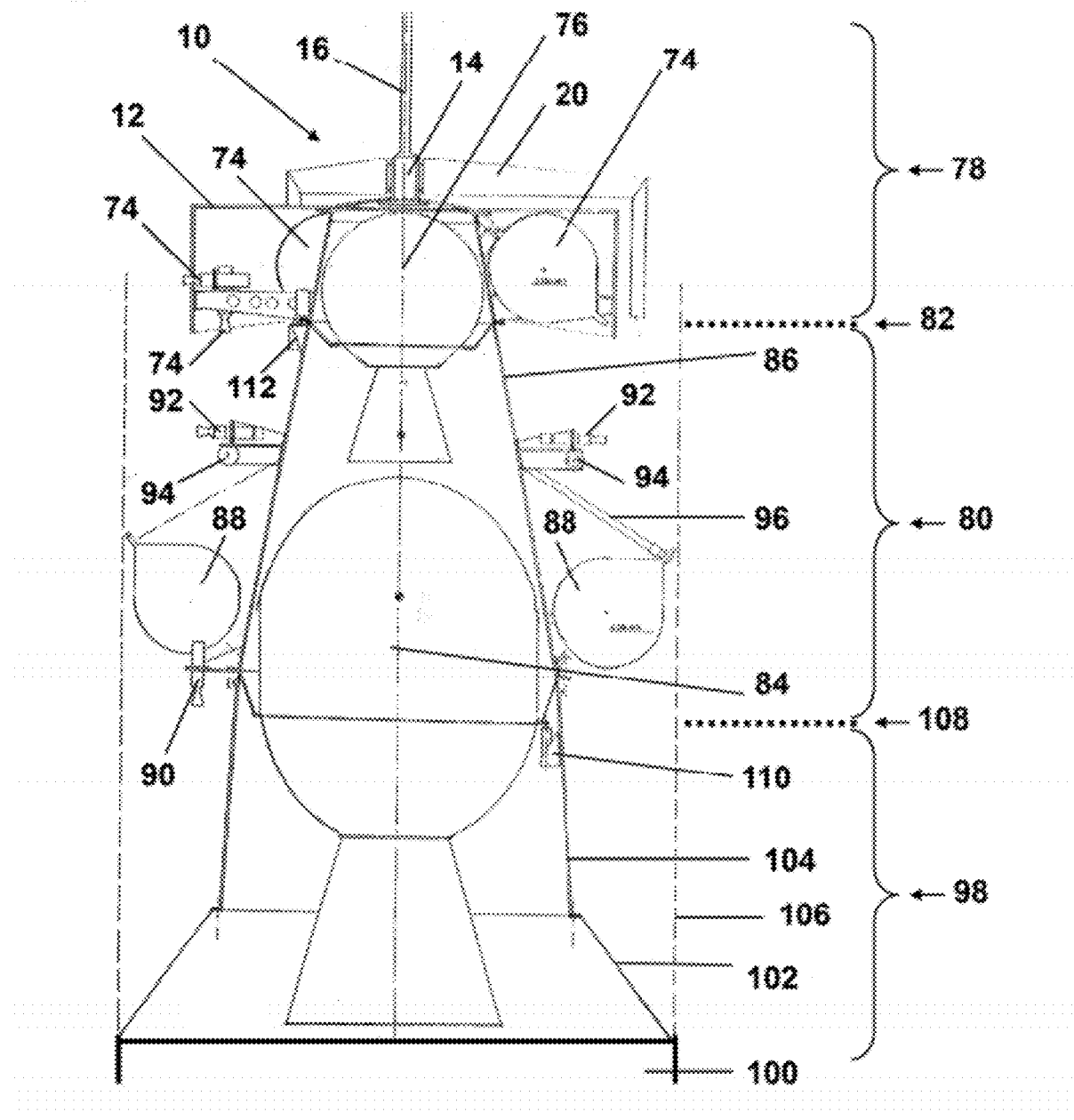
FIG. 4 is a cut-away front view of a first embodiment (monoprop version) of the present invention as configured for launch for the GLXP mission, showing key system elements.

FIG. 4 helps one understand how the first embodiment of the present invention (monoprop) is used for the GLXP mission, noting how the various systems required to execute the mission are stacked at launch. In this view, the spin-stabilized lander 10 (consisting of the spinning section 12, despun section 14, antenna mast 16 and landing legs 20) is at the top of the stack, with various components of its monoprop system 74 noted. Integrated inside the spinning section and aligned with its centerline is the lunar braking burn kick stage 76. This combined set of systems is referred to in FIG. 4 as the lander/braking stage stack 78. This stack is integrated atop the interstage 80; the two modules mate at the interstage/lander separation plane 82. The interstage includes the translunar injection kick stage 84, a primary shell structure 86, a separate monoprop propulsion system (tanks 88, axial thruster 90, radial thrusters 92 and tangential thrusters 94) and various secondary integrating structural elements 96. The flexible landing legs are bent down and connected to the interstage (not shown) during final stack integration to keep them within the volume enclosed by the main payload fairing 106. Note: even when deployed, the flexible landing leg shafts are relatively close to the spinning section outer surface—and the various thrusters on the spinning section. These shafts must be protected from the hot gas jets emanating from the thrusters, either by choice of shaft material (e.g., titanium) or with special high-temperature shields or wraps over the shafts. Likewise, the landing leg feet must be similarly protected from these hot gases as well as the rough surface conditions expected for most landings. The interstage module is mated to the launch vehicle via some launch vehicle-to-payload adapters 98 (from the launch vehicle upper stage 100 to a conical adapter 102 and interstage adapter 104), all of which remain with the launch vehicle after stack separation following jettison of the launch vehicle's main payload fairing. The launch vehicle-interstage separation plane 108 is as indicated. Separation springs for the two primary separation events are 110 and 112 as indicated. Care is taken before launch to spin-balance the interstage, the lander/braking stage stack and both modules together, since these modules all spin at some time during the mission. The SCSG team's design assessments and analyses conducted during early 2008 revealed that the entire launch stack and the separate modules (interstage and lander/braking stage) are passively unstable, requiring an active nutation control scheme during mission operations, as is common with many recent spinning spacecraft designs.

Figure 5:
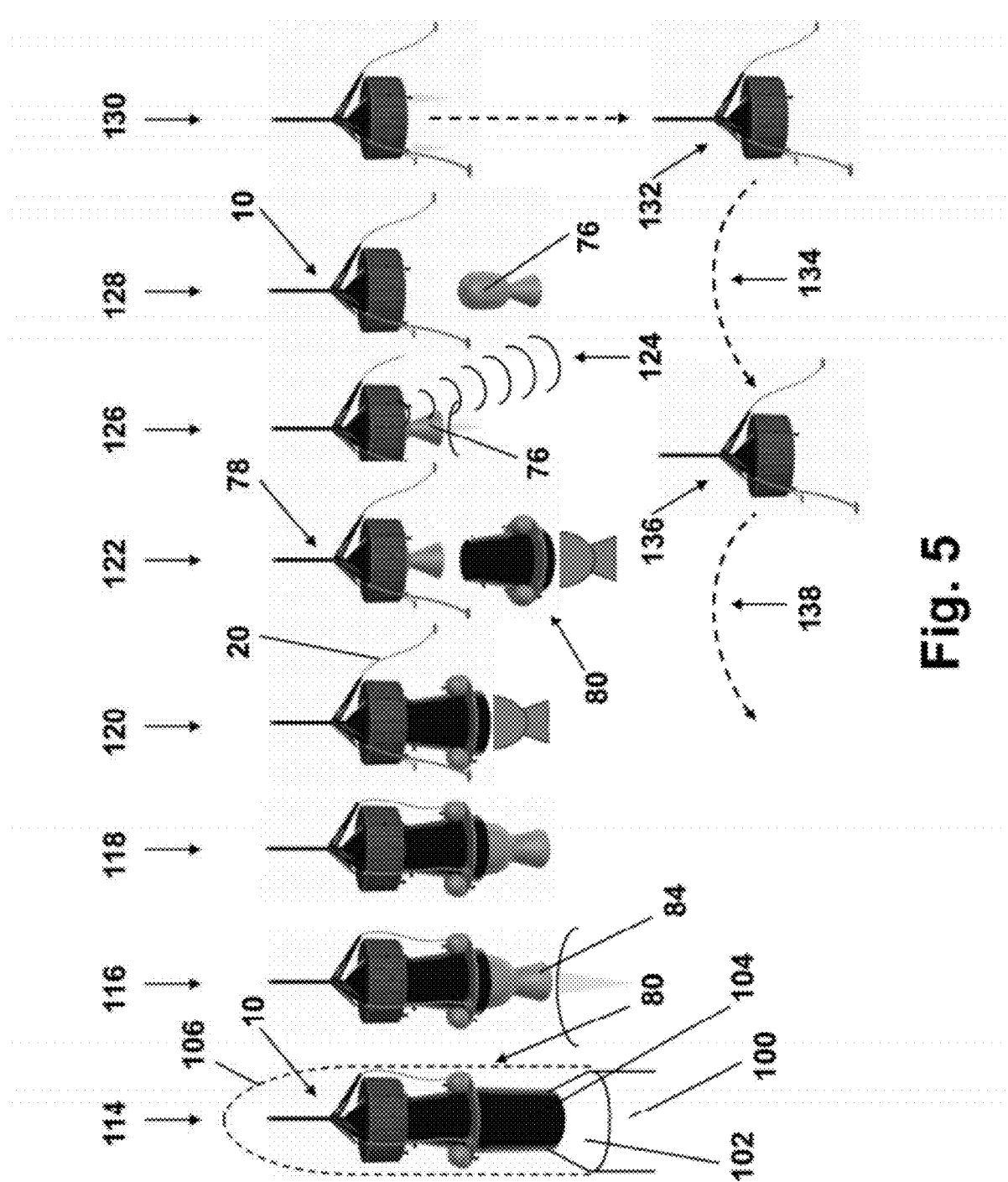
FIG. 5 shows the end-to-end mission sequence for the monoprop-based system depicted in FIG. 4, from launch through landing on the Moon, including multiple post-landing hopping sequences.

FIG. 5 depicts what happens throughout the baseline mission profile developed for this first embodiment of the present invention (monoprop) for the GLXP landing mission. Thirteen key missions phases and events are depicted and are discussed in some detail below to illustrate that this end-to-end mission design "closes" and is feasible:

Launch phase 114. During the launch phase, the launch vehicle upper stage 100 (a SpaceX Falcon 1e rocket) places the stack (lander 10 and interstage 80, all totaling about 700 kilograms) into the desired conditions in space (a 200 kilometer altitude Earth orbit), time, velocity vector and attitude following payload fairing 106 jettison. The stack is then separated from the interstage adapter 104, turns its avionics systems on, and becomes a free, operational system.

Translunar injection phase 116. During this phase, the stack is spun up, from the low to nearly zero spin rate imparted by the launch vehicle to 50 RPM, by the interstage's tangential thrusters. This relatively high spin rate provides attitude stability before the injection kick stage 84 (an ATK Thiokol Star 30) is fired and also averages out any asymmetric features of the kick stage burn. The massive spin-stabilized injection kick stage imparts a velocity increment of 3100 meters per second to the entire stack, injecting it into a 90-hour lunar transfer orbit. The stack then heads for the targeted Moon landing, shortly after local lunar sunrise, near 70 degrees West, 0 degrees North in lunar coordinates. After burnout of the kick stage, the remaining mass of the stack is about 250 kilograms.

Cruise phase 118 (first day or two). During the early part of this mission phase the interstage controls stack attitude and spin rate and performs any required trajectory correction maneuvers needed to cancel errors from the injection burn. The stack spin axis can be precessed from its translunar injection attitude to ecliptic normal attitude by pulsing the interstage axial thruster in a pre-programmed maneuver. This attitude, in which the Sun illuminates the spinning section of the lander but not its end closures, provides a benign thermal environment for all the electronic and propulsion components of the lander during its cruise to the Moon. It is also the most favorable attitude for the spinning Sun and Moon sensors used for attitude determination. It also ensures that the Earth remains in the telemetry and command antenna beams for the first phase of the transfer orbit. This allows range and range rate data to be obtained as soon as the spacecraft appears in view (because the ecliptic normal attitude places the antenna in a position that is not obscured by the spacecraft) of the first telemetry and command Earth station, so that the actual orbit can be determined, and the first in a series of orbit corrections can be executed. These orbit corrections will occur as early as possible in order to minimize propellant consumption. They will be imparted by the axial and radial thrusters on the interstage without changing the spin axis attitude.

Cruise phase 118 (later days). As the mission progresses, several trajectory corrections of decreasing magnitude may be required until the desired orbit accuracy is obtained. The stack spin speed will then be increased to 100 RPM to provide additional spin axis stability for the remainder of the mission.

Landing leg deployment event 120 and interstage jettison event 122. Shortly before lunar encounter (hours), the landing legs 20 are released from their tie-down points on the interstage and allowed to 'relax' into their approximate landing position. This frees the mechanical interface between the interstage and lander/braking stage stack, and the interstage is jettisoned. In this configuration, solar radiation pressure has almost zero moment about the center of mass of the lander/braking stage stack, resulting in a very stable spin axis attitude. This configuration has a mass of about 155 kilograms, about 50 kilograms being the lander 10, of which about 15 kilograms is hydrazine propellant.

Spinning radar operations 124, lunar braking burn event 126, and braking stage staging event 128. Less than an hour before lunar encounter at between 60 and 100 kilometers altitude above the Moon, the lander's spin axis will be reoriented from ecliptic normal to the local vertical with the Moon—the braking attitude—by proper pulsing the lander's axial thrusters. This reorientation maneuver, like the earlier precessing to ecliptic normal attitude maneuver when the interstage was attached, is controlled by a miniature rate gyro in the lander spinning section. The accuracy of these maneuvers is enhanced by the spin, which neutralizes gyro bias errors. The resulting spin axis will be within a few milliradians of the desired braking attitude. The landing site selected for this GLXP mission results in a vertical descent to the surface and also permits continuous use of the same antenna system used during Earth-to-Moon transfer operations, greatly simplifying landing operations. At about 50 to 60 kilometers altitude the spinning radar operations 126 begin to provide lunar altitude and relative vector velocity information to the lander's control system The radar beam is aimed 20 to 30 degrees away from the spin axis so that the ensuing Doppler frequency modulation at the spin rate measures the transverse velocity vector component. This avoids the need for multiple radars to measure all of the approach velocity components. At an altitude of about 26 kilometers, with approach speed of about 2500 meters per second, the lunar braking burn kick stage 76 (an ATK Thiokol Star 17A) fires and executes the required burn in about 20 seconds, nulling out all but about 50 meters per second of the relative velocity between the lander and Moon at about 4 kilometers altitude. Then, with its job over, it is staged 128, leaving the lander dropping toward the lunar surface.

Top-level engineering parameters for the radar employed in the embodiment of the present invention for spinning radar operations 124 include a FMCW (Frequency Modulated Continuous Wave) radar operating at a frequency of 10 GHz, where frequency vs. time is a sawtooth function. Referring to FIG. 1, separate fixed antennas (transmit 32 and receive 34) roughly 15 cm by 15 cm in size mounted 180 deg. apart on the spinning section 12 provide radar beam scan. Antenna separation improves isolation between transmit and receive signals during FMCW operation, and careful symmetric alignment with respect to the spin axis eliminates unwanted Doppler effects in the radar caused by the spinning motion itself. The system has a best range resolution of 0.3 meters when used at the Moon.

Descent phase 130. The lander's axial and radial thrusters are used to correct the braking burn errors and, through an appropriate velocity vs. altitude profile, control the lander to a soft landing. As the lander approaches the Moon, the horizontal velocity errors will be driven to zero by pulsing the radial thrusters while the axial thrusters control altitude and descent rate. The Sun and Moon sensor system senses and controls the lander's attitude during the landing approach phase, and shortly before touchdown onboard algorithms ensure that the relative speed between the despun section (and legs) and the lunar surface is nearly zero.

Landing phase 132. At about a meter altitude, all thrusters are turned off. The ensuing free fall and landing is cushioned by the flexible landing legs and stabilized by the gyroscopic torques resulting from the spin angular momentum. The lander may bounce or skip one or more times upon landing, but it will not tip or fall over. While on the surface, the spinning section can remain spinning (to, for example, maintain a more benign thermal environment for its systems) or be stopped (to, for example, null unwanted vibrations for detailed imaging of the landing site). At landing, the lander mass in this reference scenario is about 37 to 40 kilograms, of which about 7 to 10 kilograms is hydrazine. This remaining hydrazine is used for hopping. Estimated hopping range for this embodiment of the invention is about 1 kilometer from the initial landing site—twice as much needed to win the Google Lunar X PRIZE.

Hopping operations 134 and 138. For hopping, the spinning section of the lander must be spun up and the spinning radar system must be turned on before firing the axial thrusters to impart vertical motion. Soon after liftoff, the radial thrusters can be fired to independently impart lateral motion. Spin rate can be adjusted as needed using the tangential thrusters, while spin-axis attitude can be adjusted by off-pulsing one axial thruster, though the gyroscopic stiffness of the spinning section should maintain the spin axis in a substantially vertical attitude. (This attitude may initially be slightly off vertical due to the slope of the landing site; if so, it will be corrected to vertical during the ascent.) During the entire hopping phase the spinning radar must be operational. The descending portion of the hop is similar to the final portion of the initial landing.

A typical hop proceeds as follows. The liftoff is initiated by firing the axial thrusters, which together produce enough force to provide a net acceleration of approximately one lunar g (1.62 meters per second squared). Since the lunar surface from which the hop originates may not be level, the spin axis is reoriented to the desired vertical attitude by spin synchronous off pulsing of the axial thrusters at the spin phase angle appropriate for the correction. With the attitude vertical, the axial thrusters fire continuously for a period of time, t, determined by the desired length of the hop. This produces a vertical velocity of about 1.62 t and is followed by an axial power-off coast to the apex of the trajectory. The coast from vertical thrust cutoff to the apex also lasts t seconds, since the lunar gravity produces a downward vertical acceleration of one lunar g. The descending axial power-off arc from the apex to landing thrust start also lasts t seconds, followed by another t seconds of full axial thrust to arrive at the surface at zero vertical speed. The radial thrusters that start the horizontal motion are pulsed on, one at a time, at the phase appropriate for the desired horizontal direction of the hop. The horizontal acceleration is started as soon after liftoff as any nearby obstacles in the path to the destination have been cleared by the vertical ascent. The radial thrusting continues in the same direction until the maximum altitude is reached, at which time the direction of the thrusting is reversed, continuing in this direction until the horizontal velocity is reduced to zero shortly before touchdown, at a time approximately 4 t after liftoff. A typical hop for the monoprop embodiment of the present invention was calculated to last about 40 seconds, reach an apex of 160 meters altitude and cover about 250 meters of horizontal range, while consuming about 2.4 kilograms of hydrazine.

Landings at one or more waypoints 136 allow one lander to visit multiple sites on the surface. Because the lander of the present invention has the power supply, communication system, instrumentation, and propulsion systems needed for the roaming part of the mission, it is beneficial to roam (hop) the lander itself instead of providing a separate roamer that would duplicate all these functions. Hopping (as compared to driving or crawling) also facilitates easier travel across the surface because a hopping roamer that can leap over obstacles in a single bound. The cost of roaming using the present invention is merely the additional propellant needed for the hops.

Figure 6:
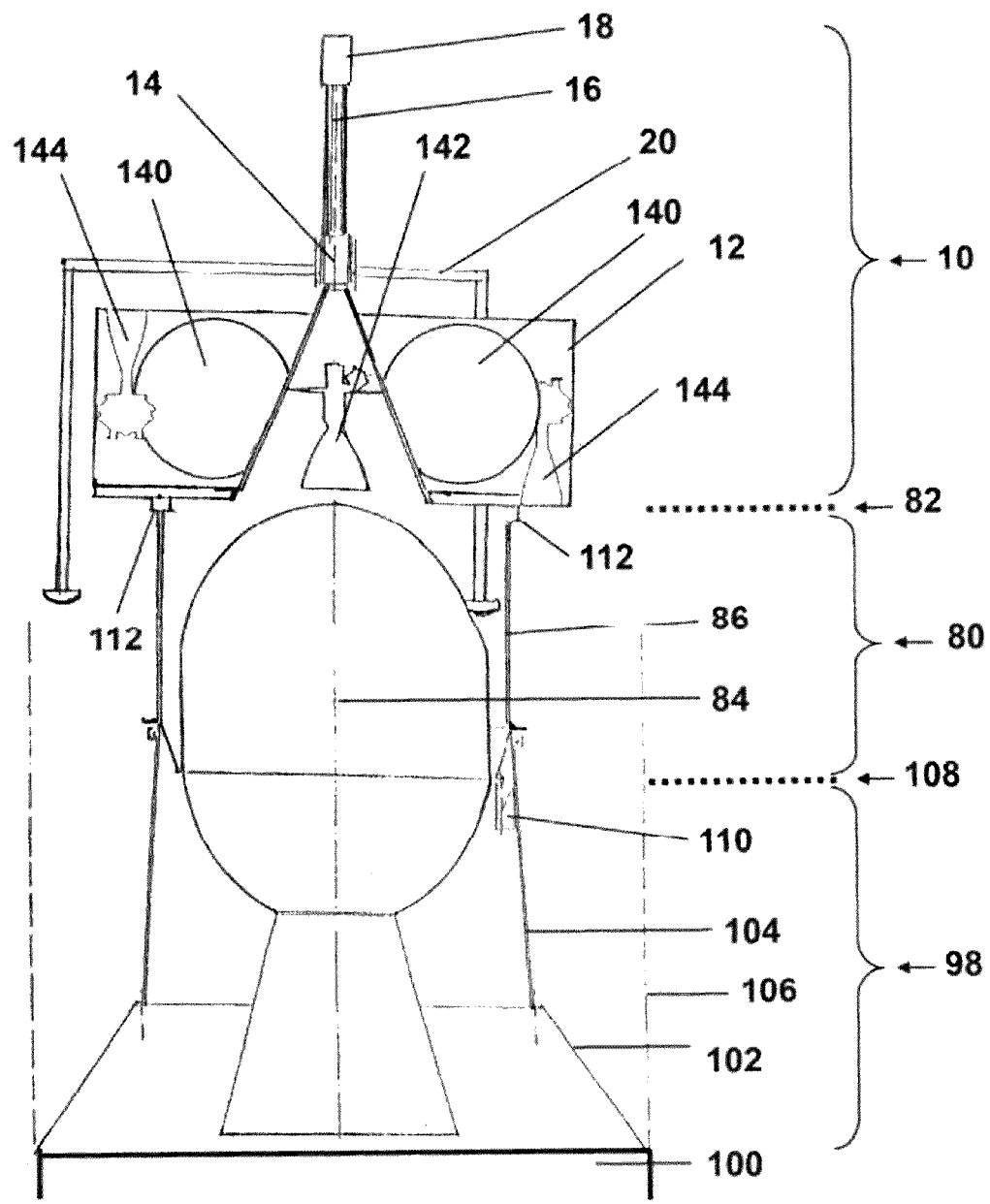
FIG. 6 follows the style of FIG. 4, but instead shows the launch stack configuration for another embodiment of the present invention—the final point-design developed by the SCSG team for the GLXP mission that employs an integral biprop system in the lander vs. monoprop approach.

FIG. 6 follows the style of FIG. 4 but instead shows the launch stack configuration for another embodiment of the present invention—the final and preferred point-design developed by the SCSG team for the GLXP mission employing an integral biprop system in the lander (including tanks 140, braking/descent engine 142 and axial thrusters 144) vs. monoprop approach. While the main elements of the launch stack are still evident—launch vehicle-to-payload adapters 98 (including launch vehicle upper stage 100, conical adapter 102, interstage adapter 104, main payload fairing 106), interstage 80 (including translunar injection kick stage 84) and lander 10 (including spinning section 12, despun section 14, antenna mast 16, despun payload module 18 and landing legs 20)—dramatic reductions in required components are realized with the biprop design. For example, the interstage no longer includes any liquid propulsion components because the SCSG's design assessments and analyses conducted during spring 2008 revealed that the entire launch stack and the separate modules (interstage and lander/braking stage) are passively stable, thus NOT requiring an active nutation control scheme during mission operations. With such system simplifications, the amount of interstage primary structure 86 is significantly reduced. Separation planes 82 and 108 and their respective separation springs 112 and 110 are functionally similar to those in FIG. 4 for the monoprop case.

The biprop embodiment in FIG. 6 came about when in spring 2008 SpaceX issued a new Falcon Lunar Capability Guide, which upgraded the performance of the Falcon 1e to provide up to 1000 kilograms into low Earth orbit vs. the earlier advertised 700 kilograms. This enabled the SCSG team to incorporate some design improvements (targeting a 900 kilogram launch stack) that had not been feasible under the previous 700 kilogram allowance. These improvements have allowed for more mass allocation for the lander electronics, up to 15 kilograms of hopping propellant and increased hopping range, with the potential of hopping up to 5 kilometers.

Figure 7:
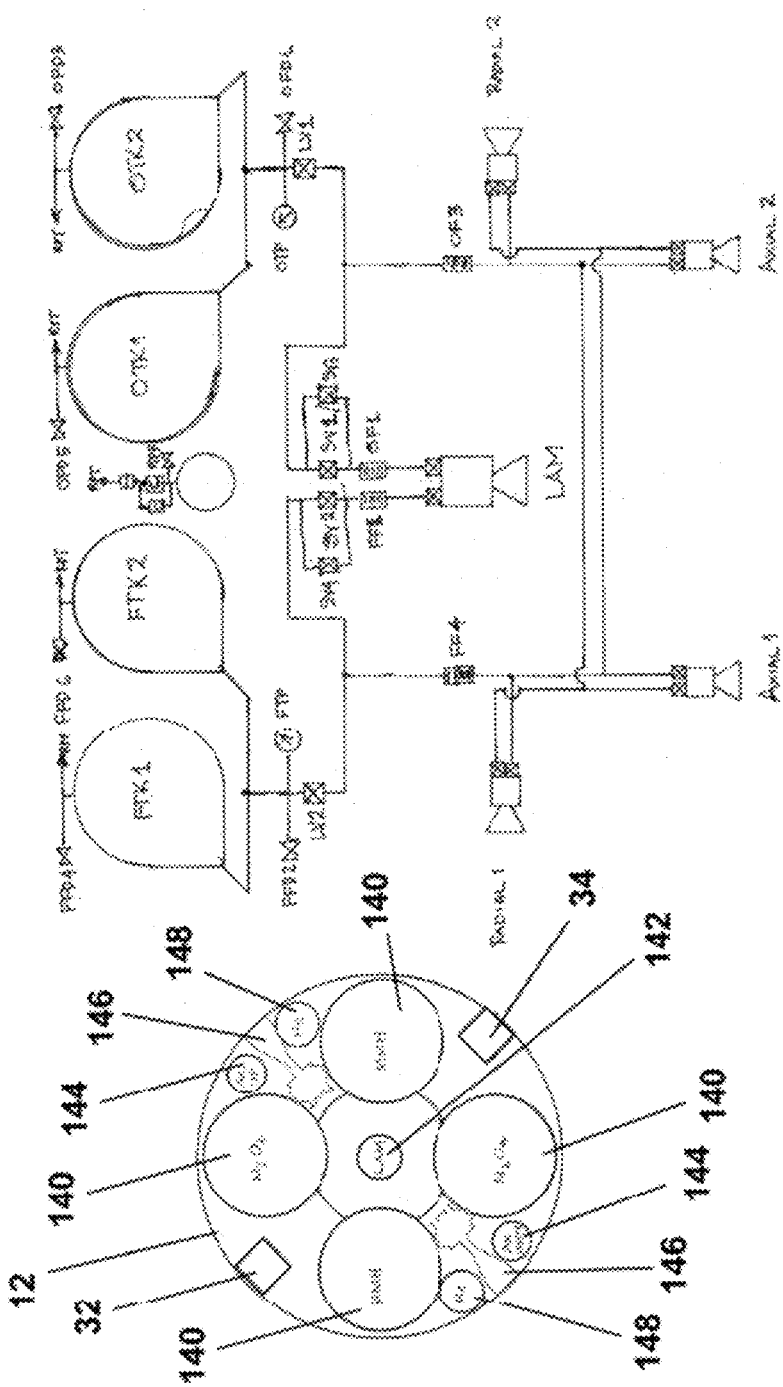
FIG. 7 depicts additional details of the biprop lander design, showing a plan cross-sectional view of the spinning section and how the various hardware elments are integrated in it, as well as an overall biprop system plumbing diagram FIG. 8 summarizes key aspects of the method employed for controlling the lander throughout its mission.

FIG. 7 shows more detail about the preferred biprop embodiment of the present invention, showing a plan cross-sectional view of the spinning section 12 with the various biprop components arranged symmetrically around the spin axis: biprop tanks 140 (two for fuel, two for oxidizer), a single centerlined braking/descent engine 142, two axial thrusters 144, two radial thrusters 146 and two Helium pressurant tanks 148 for the entire biprop system. Also shown are where other key spinning section components like the spinning radar antennas (transmit 32 and receive 34) would be placed.

FIG. 7 also includes an overall biprop system plumbing diagram, indicating how the fuel and oxidizer tanks, pressurant tanks, thrusters, valves, filters and propellant lines are interconnected, as is common industry practice for spinning spacecraft. A key to this diagram follows:

OFD1, OFD3 and OFD5=Oxidizer Fill and Drain valves
FFD2, FFD4 and FFD6=Fuel Fill and Drain valves
RPT=RePressurant Tank port
RTK=RePressurant Tank (148, only one drawn)
OTK1 and OTK2=Oxidizer Tanks 1 and 2 (140)
FTK1 and FTK2=Fuel Tanks 1 and 2 (140)
C=Check valve
RPF=RePressurant Fill valve
OTP=Oxidizer Tank Pressure sensor
FTP=Fuel Tank Pressure sensor
LV1=Oxidizer side Latching Valve
LV2=Fuel side Latching Valve
SV1 and SV3=Oxidizer side Solenoid Valves
SV2 and SV4=Fuel side Solenoid Valves
OF1 and OF3=Oxidizer line filters
FF2 and FF4=Fuel line filters
LAM=Liquid Axial Motor (Lander bipropellant braking/descent engine 142)
Radial 1 and Radial 2=Lander bipropellant radial thrusters (146)
Axial 1 and Axial 2=Lander bipropellant axial thruster (144)

Figure 8:
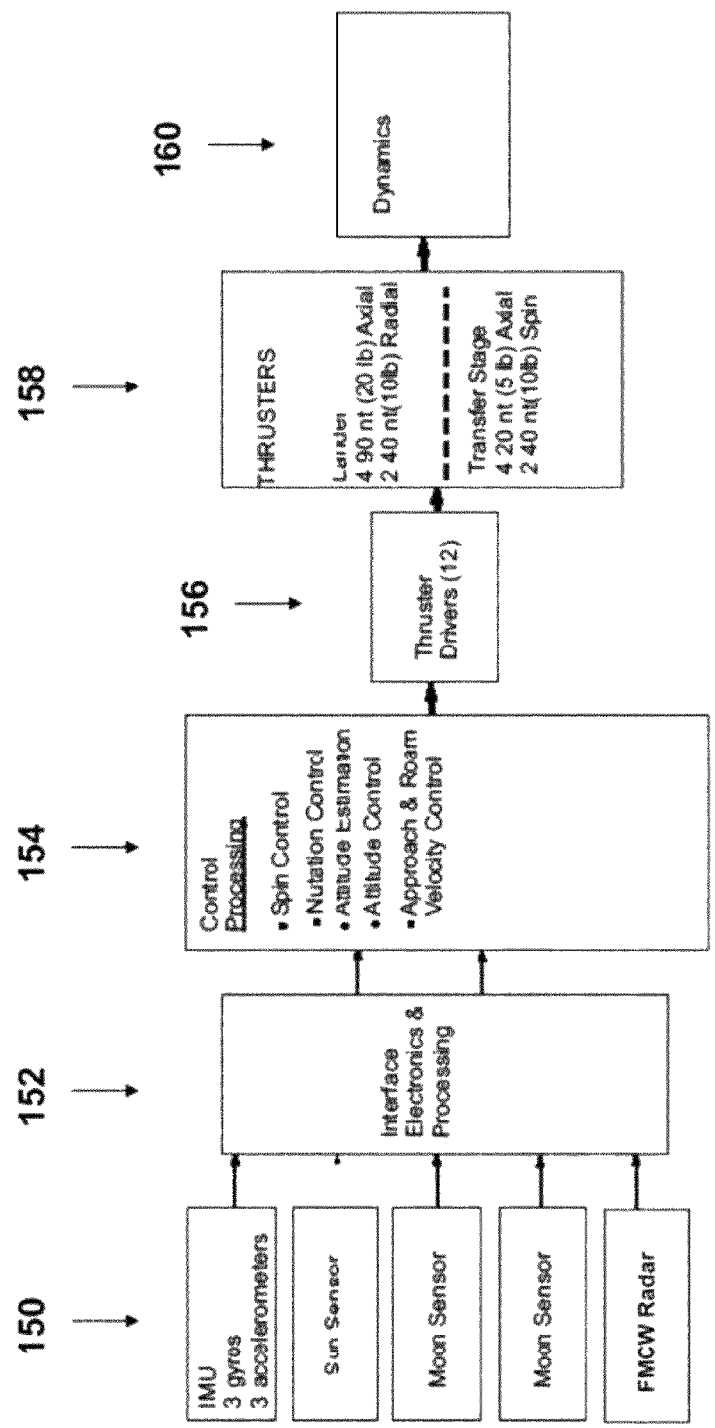

FIG. 8 summarizes the overall method for controlling the vehicle dynamics of the present invention. Among other things, FIG. 8 locates "Control Processing" including "Spin Control" (means for independently controlling the spin rate of the spinning section and the spin rate of the despun section, spin-up and spin-down control), and "(Attitude Control" means for sensing and controlling lander attitude. However, spin rate control between the spun and despun sections of the lander is not addressed here because such techniques are not novel and have been in practice for decades. Most aspects of the approach depicted in this figure have been employed on dual-spin spacecraft for the past few decades except for the use of the FMCW radar inputs shown on the left. Onboard sensors 150 that sense the Sun, Moon, vehicle rotation and acceleration, plus received signals from the FMCW radar are input into one or more sensor interface electronics units 152 for raw sensor data capture, shaping and conversion. The outputs of these processes serve as inputs to vehicle control algorithms 154 stored in the vehicle's onboard processor. These algorithms process the inputs from 152 into signals for determining vehicle inertial attitude and controlling vehicle spin, nutation, and attitude. Also, as a new function not onboard any spinning satellites to date, 154 includes algorithms for determining landing surface approach parameters to support vehicle velocity control during landing and hopping operations. Control signals from 154 flow to various thruster drive electronics circuits 156 that are used to control all vehicle thrusters 158. The force outputs imparted by these thrusters ultimately control the vehicle dynamics. Systems such as this can control vehicle attitude to milliradians, thruster on times (and maneuver executions) to milliseconds and execute velocity changes to small fractions of a meter per second. These control systems are matched quite well with the intended uses of the present invention in any embodiment discussed herein.

In any of the embodiments described above, the various components and piece-parts can be fabricated using any of a variety of techniques well known in the art. Materials can include metallics, composites, plastics, or many other possible materials. Parts can be formed using machining, forging, casting, layup, stereo-lithography, or many other possible techniques. Electronic components can be constructed from off-the-shelf items or custom designed ones. The particular choice of materials and designs will depend upon the intended application.

What is claimed is:

1. A lander to land on a moon or other target solar system body, comprising:
    a spinning section adapted to spin about a spin axis at a first spin rate, such that the lander has a desired gyroscopic spin angular momentum;
    a despun section adapted to spin about the spin axis at a second spin rate;
    spin control means for independently controlling the spin rate of the spinning section and the spin rate of the despun section;
    attitude control means for sensing and controlling lander attitude;
    landing gear fixedly attached to the despun section, the landing gear having at least one leg that is a flexible, compliant leg for safely spanning from the despun section to the target solar system body and including a foot adapted to land on and drag along the target body, and that dampens a mechanical oscillation of the lander that occurs during a touch-down phase of the landing, wherein the at least one leg extends beyond the periphery of the spinning section;
    a propulsion system that includes one or more tangential thrusters to the spinning section to provide a spin-up and a spin-down control, at least one axial thruster and at least one radial thruster;
    a spinning section payload module mounted to the spinning section, and adapted to accommodate at least one payload;
    at least one auxiliary payload configured to use a pointing capability of the spinning section to point at least one auxiliary payload toward a selected azimuth direction;
    at least one auxiliary payload configured to use a pointing capability of the despun section to point at least one auxiliary payload toward a selected azimuth direction;
    a despun payload module mounted to the despun section, and adapted to accommodate the at least one payload; and
    a spinning descent radar having a radar beam tilted away from the axis of spin of the lander by a sufficient amount to provide velocity and range vectors derived from a modulation of Doppler frequency at the spin rate of the spinning section.

2. The lander according to claim 1, wherein the attitude control means is further adapted to control the lander's attitude in a sitting phase during which the lander maintains itself in an upright or nearly upright position while sitting on the target body.

3. The lander according to claim 1, wherein the propulsion system is a selected one of a monopropellant propulsion system, a combined hybrid involving liquid and solid propulsion and a combination of a monopropellant propulsion system and combined hybrid involving liquid and solid propulsion.

4. The lander according to claim 1, wherein the spinning descent radar is a frequency modulated, continuous wave radar.

5. The lander according to claim 1, wherein the vehicle system is further adapted to traverse and explore the target solar system body by hopping safely from one landing site to another.

* * * * *